United States Patent
Straub et al.

(10) Patent No.: US 6,914,895 B1
(45) Date of Patent: Jul. 5, 2005

(54) METHOD FOR SYNCHRONIZATION IN A COMMUNICATION NETWORK AND IMPLEMENTING APPLIANCES

(75) Inventors: Gilles Straub, Acigne (FR); Helmut Buerklin, Rennes (FR); Vincent Demoulin, Pleumeleuc (FR); Renaud Dore, Rennes (FR); Patrick Lopez, Livré s/Changeon (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/673,713
(22) PCT Filed: Apr. 21, 1999
(86) PCT No.: PCT/FR99/00944
§ 371 (c)(1), (2), (4) Date: Oct. 20, 2000
(87) PCT Pub. No.: WO99/55028
PCT Pub. Date: Oct. 28, 1999

(30) Foreign Application Priority Data

Apr. 21, 1998 (FR) .......................................... 98 04982

(51) Int. Cl.$^7$ ................................................ H04J 3/06
(52) U.S. Cl. .................... 370/350; 370/352; 370/402
(58) Field of Search ........................ 370/352, 401, 370/409, 265, 347; 340/572.1; 345/805, 746, 850; 717/125, 134; 455/11.1, 88, 423, 507, 557, 805, 746–753; 709/227; 719/776; 713/400

(56) References Cited

U.S. PATENT DOCUMENTS

| | | | |
|---|---|---|---|
| 4,471,345 A | * | 9/1984 | Barrett, Jr. ............... 340/572.1 |
| 4,815,110 A | | 3/1989 | Benson et al. ............... 375/107 |
| 5,052,029 A | | 9/1991 | James et al. ................ 375/107 |
| 5,553,077 A | * | 9/1996 | Martinez Garcia et al. . 370/347 |
| 6,389,547 B1 | * | 5/2002 | James et al. ................ 713/400 |
| 6,516,442 B1 | * | 2/2003 | Wang et al. ................ 714/776 |

FOREIGN PATENT DOCUMENTS

| EP | 0643503 | 3/1995 | ............ H04J/4/00 |
| GB | 2264842 | 9/1993 | ............ H04K/1/04 |

* cited by examiner

*Primary Examiner*—Chi Pham
*Assistant Examiner*—Prenell Jones
(74) *Attorney, Agent, or Firm*—Joseph S. Tripoli; Robert D. Shedd; Paul P. Kiel

(57) ABSTRACT

A process for synchronization in a communications network comprising at least two buses interconnected by a wireless communications network, each bus being linked to the wireless communications network by a portal. The process comprises the steps of: determining a so-called cycle server portal whose own clock will serve as a reference for the other portals; transmitting, via each portal, a synchronization signal at a predetermined instant with respect to the start of a frame and characteristic of each portal, the frame being defined with respect to each portal's own internal clock, the synchronization signal being achieved via the insertion of a control window; and detecting, via each portal, the control windows of other portals and selecting one of the detected windows for the synchronization of the receiver portal's own clock with the clock of the cycle server portal, the selected window corresponding to a portal whose clock is already synchronized with that of the cycle server portal. The invention also relates to receiver and transmitter apparatuses implementing the process.

13 Claims, 4 Drawing Sheets

Figure 1:
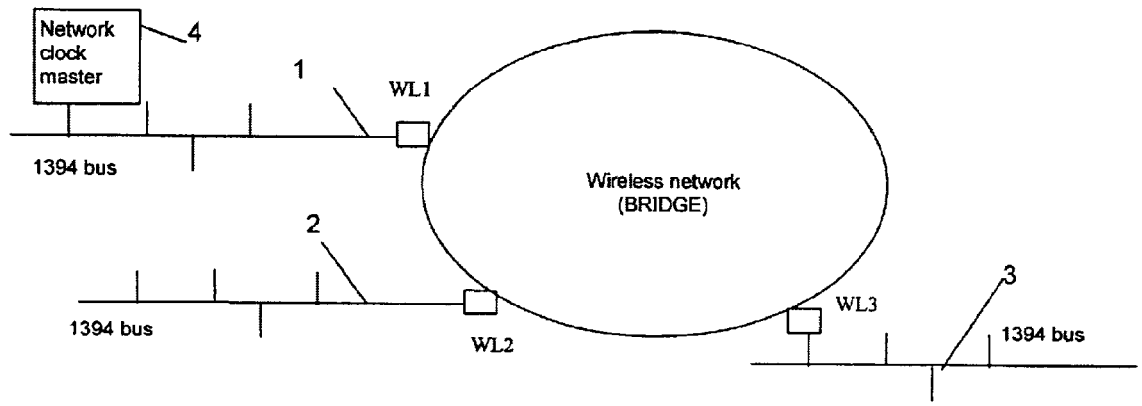

METHOD FOR SYNCHRONIZATION IN A COMMUNICATION NETWORK AND IMPLEMENTING APPLIANCES

BACKGROUND OF THE INVENTION

The invention relates to a process for synchronizing apparatuses connected to a communication network comprising wireless links. It applies in particular within the context of a domestic communication network. The invention also relates to apparatuses for implementing this process.

In an IEEE 1394 type bus described in the IEEE 1394-1995 standard, each apparatus ("node") linked to the bus stamps the isochronous packets which it transmits with a time cue indicating the instant at which the packet is to be retrieved by the receiver apparatus.

Each apparatus (or "node") linked to the bus comprises a 32-bit clock register incremented at the clock frequency of the bus, namely 24.576 MHz. This register (referred to as the "Cycle Time Register" in the IEEE 1394-1995 standard) is divided into three areas (the 12 lowest-order bits, the 13 intermediate-order bits and the 7 highest-order bits), which are therefore incremented at frequencies of 24.576 MHz, 8 KHz and 1 Hz respectively.

In the presence of apparatuses able to participate in isochronous traffic, and in order to synchronize these apparatuses, one of them is elected "Cycle master apparatus or node" (to use the IEEE 1394 terminology). The cycle master apparatus generates an isochronous frame or cycle start packet every 125 µs, this corresponding to a frequency of 8 KHz. This packet comprises the value of the 32-bits clock register of the cycle master apparatus at the moment of transmission. A packet receiver apparatus slaves its own 32-bit register to the values received from the cycle master apparatus.

The IEEE 1394-1995 document mentioned hereinabove relates to the architecture of the serial bus. An additional standard, relating to the interconnecting of several buses by way of bridges is currently being compiled. The latest version of this draft currently available from the IEEE has the reference P1394.1 draft 0.04, and dates from 7 Feb. 1999, the previous version dating from 18 Oct. 1997.

When several buses are interconnected by means of a bridge, it is vital to employ the same clock on either side of the bridge, for correct interpretation of the time markers of the packets and correction of clock drift.

SUMMARY OF THE INVENTION

For this purpose, the subject of the invention is a process for synchronization in a communication network comprising at least two buses interconnected by a wireless communication network, each bus being linked to the wireless communication network by a portal, the said process being characterized in that it comprises the steps:

of determining a so-called cycle server portal whose own clock will serve as reference for the other portals;

of transmitting, via each portal, a synchronization signal at a predetermined instant with respect to the start of a frame and characteristic of each portal, the said frame being defined with respect to each portal's own internal clock, the said synchronization signal being achieved via the insertion of a control window;

of detecting, via each portal, the control windows of other portals and of selecting one of the detected windows for the synchronization of the receiver portal's own clock with the clock of the cycle server portal, the said selected window corresponding to a portal whose clock is already synchronized with that of the cycle server portal.

The clock is thus propagated gradually among the portals, which one after the other lock onto the clock of the cycle server or onto that of a portal closer to the latter and whose clock is already at least partially synchronized.

According to the preferred embodiment of the invention, a control window comprises at least a part of a value of the clock of the transmitter portal of the said control window, the said value being that of the clock at the moment of transmission of the said control window, the said value transmitted being used by the receiver portal to update the value of its own clock.

According to one embodiment of the invention, the clock value transmitted by a portal comprises a correction for compensating for the processing time of the control window on transmission.

According to one embodiment of the invention, the clock value received by a portal is corrected, before the updating of the value of its own clock, so as to take account of the reception processing time of the said portal.

According to one embodiment of the invention, the said clock value is split up into several groups of bits transmitted over successive control windows transmitted by one and the same portal.

According to one embodiment of the invention, the process furthermore comprises the step of determining, by each portal, its distance with respect to the cycle server portal, the said distance of a given portal being defined as being the minimum number of repeater portals required in order for an item originating from the cycle server portal to reach the said given portal.

According to one embodiment of the invention, the control window chosen by a given portal for synchronizing itself is the control window of a portal having the shortest distance among the control windows received by the said given portal.

According to one embodiment of the invention, the process furthermore includes the step of locking a phase locked loop of a receiver portal to the instant of reception of the selected control window, the said phase locked loop being used to increment a register containing the said portal's own clock value.

According to one embodiment of the invention, the process furthermore comprises the step of selecting a cycle master node of the entire communication network from among the nodes connected to the network, the cycle server portal being the portal connected to the bus to which the said cycle master node of the network is also connected, the said cycle server portal synchronizing its own clock to a clock of the said cycle master node of the network.

According to one embodiment of the invention, the communication buses being of the IEEE 1394 type, the synchronization of the cycle server portal to the cycle master node of the network is performed by way of cycle start packets transmitted by the said node, the frequency of transmission of frames over the wireless part of the network being a submultiple of the frequency of transmission of the cycle start packets.

According to one embodiment of the invention, a clock belonging to a portal which is not the cycle server portal is used to synchronize the bus to which the said portal is connected.

The subject of the invention is also an apparatus for interfacing a cable bus and a wireless communication network, characterized in that it comprises:

means of clock recovery utilizing the said cable bus, these recovery means comprising a phase locked loop for locking onto a periodic signal travelling around the cable bus and a counter for counting an own-clock absolute value, the said counter being linked to a clock derived from the phase locked loop for the incrementation of the said counter, the absolute value of the said counter being synchronized with that of a node connected to the cable bus;

means of periodic transmission to the wireless communication network of a control window serving as time reference for the other apparatuses connected to the wireless network, the generation of the said control window being bound with the state of the said counter, the said control window comprising an item relating to the state of the said counter at the moment of transmission of the said control window.

The subject of the invention is also an apparatus for interfacing a cable bus and a wireless communication network, characterized in that it comprises:

means of clock recovery utilizing a signal transmitted over the said wireless communication network, the said recovery means comprising a phase locked loop and an own-clock register;

means ($\mu'$) for selecting one control window from among a plurality of control windows transmitted over the wireless network;

means (41) for extracting a synchronization of the said control window for feeding the said phase locked loop;

means (47) for extracting items relating to the absolute value of a reference clock of the said control window, and for updating the said own-clock register.

SHORT DESCRIPTION OF THE DRAWINGS

Figure 2:
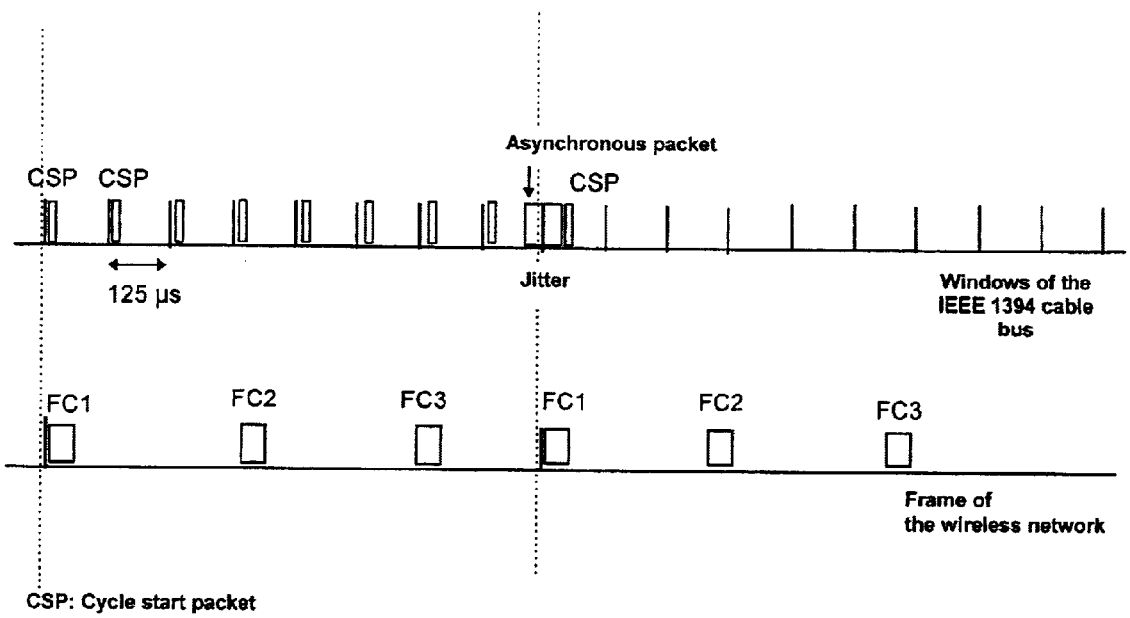
Figure 3:
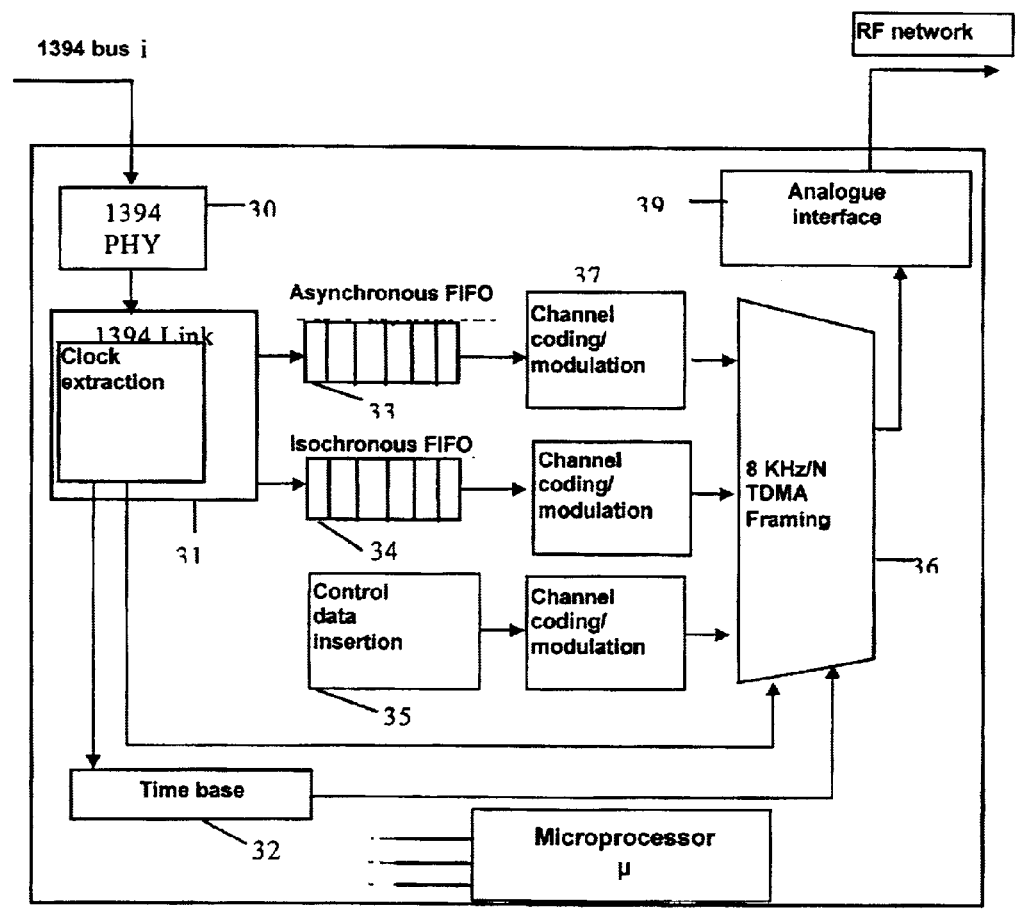
Figure 4:
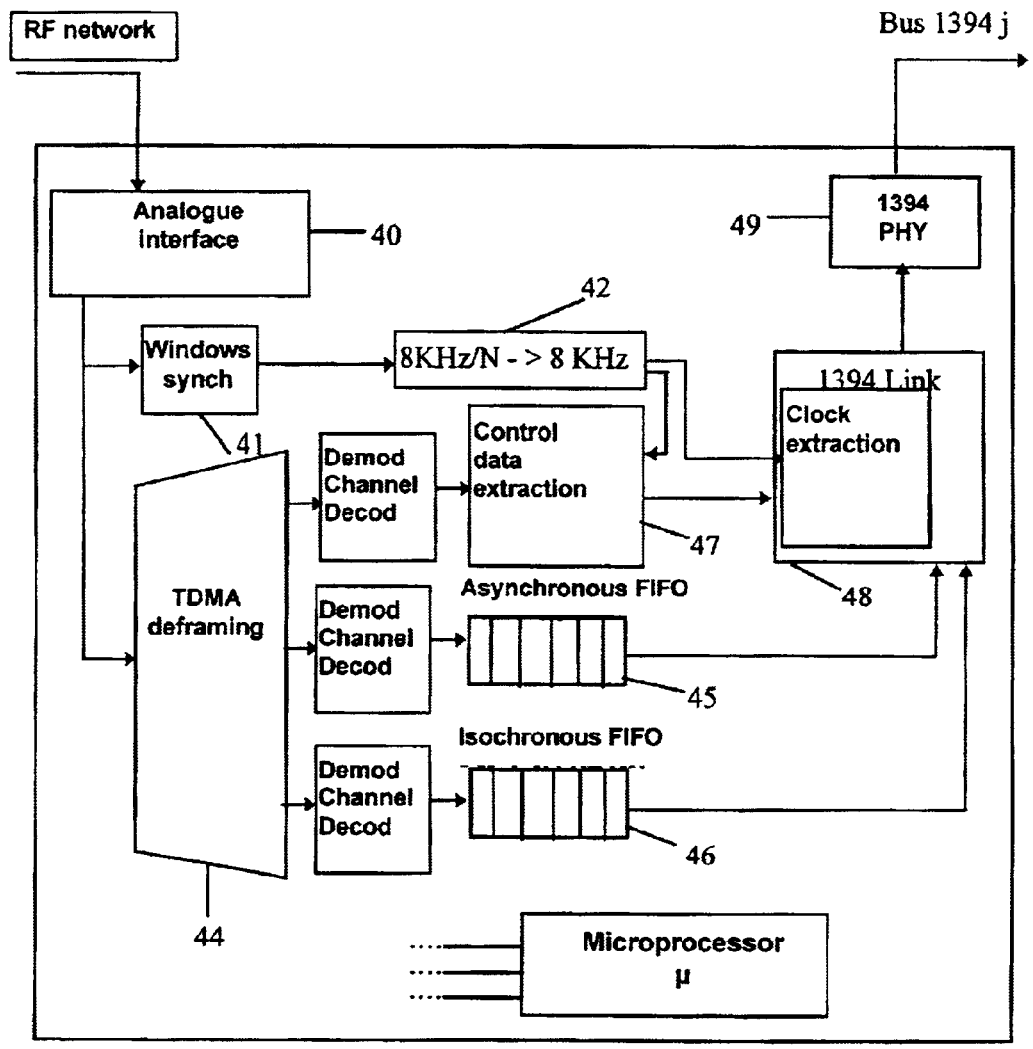
Figure 5:
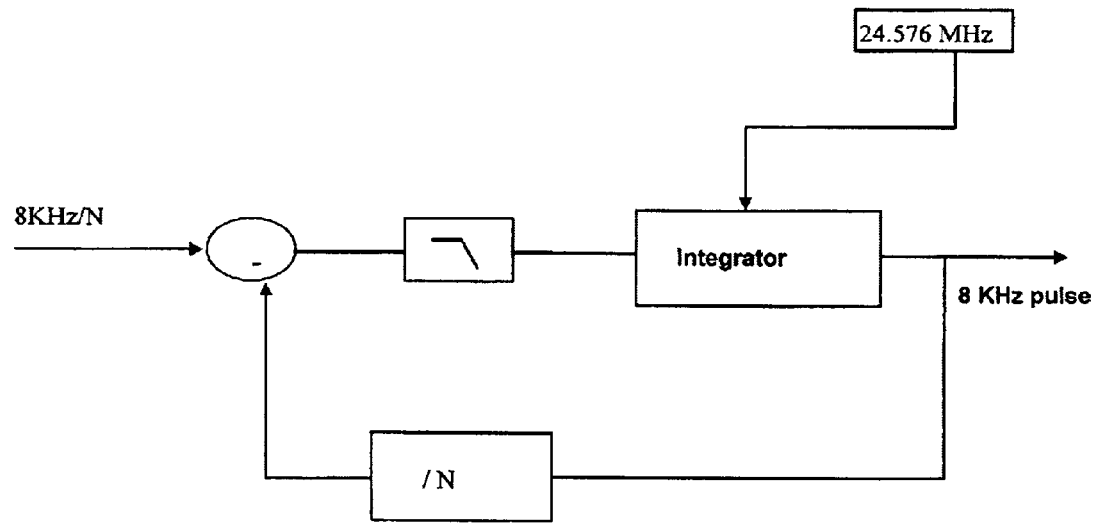
Figure 6:
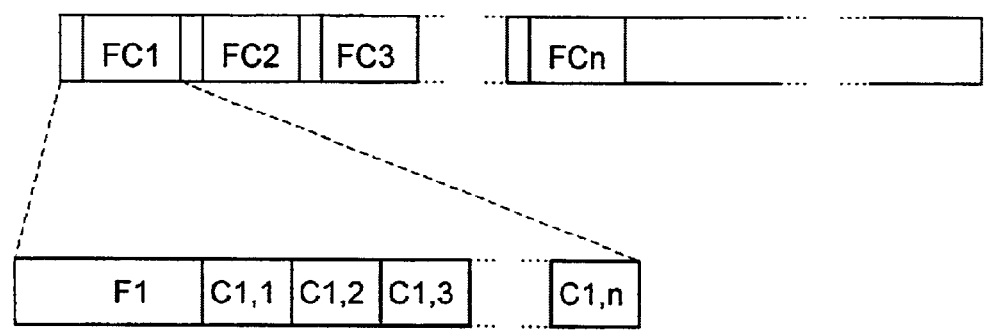

Other characteristics and advantages of the invention will become apparent through the description of a particular non-limiting exemplary embodiment illustrated by the appended figures among which:

FIG. 1 is a diagram representing three IEEE 1394 buses linked by a bridge consisting of three portals communicating with one another by wireless transmission, FIG. 2 is a diagram illustrating the phase jitter introduced by the transmission of an asynchronous packet, FIG. 3 is a functional schematic of the circuits of a bridge receiving data from a bus and transmitting to the "wireless" network, FIG. 4 is a functional schematic of the circuits of a bridge receiving data from the "wireless" network and transmitting to a bus, FIG. 5 is a schematic of a circuit for restoring an 8 kHz clock from an 8/N kHz clock, and FIG. 6 is a diagram of a frame used in the exemplary embodiment.

DETAILED DESCRIPTION OF AN EMBODIMENT

Although the exemplary embodiment relates to IEEE 1394 buses and although the description uses certain terms arising from the terminology associated with this type of bus, the invention is not limited to the IEEE 1394 bus and can be applied in other environments.

The network of FIG. 1 comprises three IEEE 1394 type buses referenced 1, 2 and 3, interconnected by a wireless network 5 to which the buses are respectively linked by nodes referred to as "portals" (to use the terminology adopted by the document P1394.1) WL1, WL2 and WL3. The portals communicate with one another by wireless transmission, at radio frequencies according to the present exemplary embodiment. It is assumed that the union of the portals constitutes what will be called a wireless "bridge" hereinbelow, interconnecting the buses.

These portals are each also members of one of the cable buses, and therefore constitute nodes within the meaning of the IEEE 1394 standard in the same sense as the other apparatuses connected to the buses. With the aim of synchronizing the entire network, one of the apparatuses connected to one of the buses is elected "network cycle master apparatus" (or "net cycle master"). It should be noted that this concept is wider than that of "cycle master" which is limited to a bus. This apparatus bears the reference 4 in FIG. 1. The cycle master apparatus of the network, which can also be one of the portals, is designated by the manager of the bridge ("prime portal" according to the IEEE P1394.1 terminology) from among the cycle master apparatuses of the various cable buses. The cycle master apparatus of the network can, by way of example, be that of the apparatuses potentially having this capacity and possessing the highest serial or identification number.

The portal which is the network cycle master apparatus, or the portal connected to the bus to which the network cycle master apparatus is connected, is dubbed the "cycle server". It is the cycle server whose job it is to transmit the clock originating from the network cycle master apparatus to the other portals. The cycle master apparatuses of the other buses will lock onto the clock received from their portals.

According to a particular embodiment of the invention, each node is furnished with a register of which two flags indicate in the case of the first flag if the node is cycle master of the bus and in the case of the second flag if the node is cycle master of the network. For each portal, it is thus sufficient to read this register on the cycle master of its bus (the node identifier, called the "node_id" of the cycle master is known and has the value 0). The portal which determines that the cycle master of its bus is the cycle master of the network then becomes the cycle master of the wireless network.

The wireless network uses a TDMA mechanism (standing for "Time Division Multiple Access") to access the transmission channel. This access mechanism is the subject of a French Patent Application filed in the name of the Applicant on the same day as the priority application of the present application (21 Apr. 1998), and filed under the number FR 9804983. In parallel with this, the mechanism for accessing an IEEE 1394 bus from a node per se is defined in a more precise manner in the IEEE documentation relating to this standard and to which reference may be made if required.

A TDMA frame is subdivided into windows during which the portals can transmit. The allocating of one or more windows to a portal is done by a reservation mechanism allowing a portal to express its transmission requirements and to contrast them with the requirements of the other portals for optimal sharing of the wireless channel. The reservation is done by way of the so-called control windows. A window, whether it be a control window or data window, is a predetermined time interval whose start is defined relatively in relation to the start of the frame. One control window per frame is allocated to each apparatus liable to transmit. The information transmitted by a portal in its control window is reused and propagated in the control windows of the other portals. Thus, even under incomplete connectivity (namely when there is no direct link between at least two portals), the control cues are propagated throughout the wireless network.

FIG. 6 illustrates the format of a frame and of a control window among those present in the frame.

The TBMA frame comprises a zone of n control windows FCm and a zone of data windows D, where n is the number of portals of the wireless bridge. Each control window FCm comprises a so-called fixed window F, followed by n so-called repeated windows Cm,p. The repeated windows CM,p in a control window have the same order as the control windows in a frame. Stated otherwise, if a portal X transmits the control window FC2, then the repeated windows Cm,2 of the other control windows will be reserved for the repetition of the control data of portal X.

Although all the control windows are contiguous in the example illustrated in FIG. 6, this is not necessarily always the case the control and data windows can be interleaved. The main constraint is that the position of the control windows within the frame, as well as the correspondence between each control window and each portal must be known by each of the portals. By way of practical example, the control windows are numbered in ascending order and presented in this order within the frames. Each portal also possesses a unique order number which identifies it at the level of the wireless bridge. A portal uses the control window which corresponds to its own unique number.

The control window FCm is that transmitted by portal m. The fixed window of the control window FCm comprises items intended for the neighboring portals of transmitter portal m. The content of this fixed window is not repeated by the portals which receive the window. Typically, the fixed window comprises the address of the transmitter portal and the distance from the portal to the cycle server, as well as a reservation request for data windows in "contention" mode.

The repeated window Cm,m of the control window FCm comprises data indicating if the portal m is cycle server of the network, as well as if appropriate a reservation request in "isochronous" mode or "asynchronous" mode for data windows.

The other repeated windows of the control window FCm comprise the contents of the control windows, received directly or indirectly from the portals other than the portal m. A portal repeats the control data of another portal once only. For this purpose, each portal stores the content of the control windows received from the other portals and verifies that it has not already repeated them earlier before copying them back to its own control window.

Three mechanisms for reserving data windows are provided:

An isochronous reservation mechanism: when a portal wishes to transmit an isochronous stream (corresponding to a known and constant bit rate), it transmits a datum in its control window indicating the number of windows per frame which it estimates that it requires. This reservation is valid for the future frames, until the reservation is cancelled.

An asynchronous reservation mechanism: at each frame, a portal transmits a datum in its control window indicating the number of data windows which it wishes to reserve in the present frame. The reservation is valid only for one frame and must be renewed for other frames if so required.

According to the two reservation mechanisms above, it is the job of each portal of the network to repeat in its own control window during future frames the window reservations performed by each other portal connected to the wireless network, such as they were previously transmitted in the control window reserved for each of these other portals. From these requests as well as from unequivocal rules each apparatus then deduces what the actual occupancy of the next frame will be. The unequivocal rules, which are not the subject of the present patent application, serve to determine which portal has the right to transmit when there has been contention in the reservation. An apparatus does not actually use the number of windows reserved until it is certain that on the one hand all the apparatuses connected to the wireless network have indeed received the item, (this depending on the configuration of the network), and that on the other hand it is the one which is authorized to transmit (if there has been contention in the reservation).

Finally there is provided a last so-called contention mechanism. Because of the configuration of the network (and of the successive rebounds necessary for propagating the reservations), a portal may have to wait a certain number of frames between the moment of reservation, and the moment of actual dispatch of the data. However, it may be that the coming frame turns out to be sparsely loaded. The contention mechanism can be used in such a case. The portal must use the control window to indicate the number of windows which it will use: these will be as yet unreserved windows. It inserts its data into the same frame as its control window, into data windows which follow its own control window. It is clear that if two portals are performing the same transmission at the same time, there will be collision. The transmission phase must therefore be accompanied by an acknowledgement phase generated by the recipient.

The wireless network uses an isochronous frame locked onto a submultiple of the 8 kHz clock, that is to say an 8/N KHz clock. Advantageously, N will be taken to be a power p of two, and according to the present exemplary embodiment, p=6 at most. The clock is obtained by considering the 13-p bits of the second area of the clock register. This clock is obtained initially, in accordance with the IEEE 1394 standard, by the bridge WL1 (cycle server) connected to the bus to which the cycle master apparatus of the network 4 is linked.

An 8/N kHz clock is chosen with the aim of reducing the passband set aside for the control data as opposed to the useful data in the frames. According to the present example, N is chose n equal to 8. On account of the transmission constraints peculiar to the TDMA technique (where one of the critical problems is the automatic gain control ("AGC") on the reception side which must be carried out each time the transmitter changes, the AGC thus requiring the insertion of an idle time of 2 to 3 $\mu$s before each frame), the duration of a frame cannot drop below a certain value. It is assumed that a duration of 5 $\mu$s is the minimum value such that one does not lose too much efficiency at transmission level. As already mentioned, the control windows serve to signal to the other portals the transmission intentions of each portal in the frame. Therefore, one control window per portal and per frame is necessary therein. These constraints mean that the loss of passband (control item/useful items) is greater on a short frame. The use of: a frame locked onto an 8/N KHz clock therefore makes it possible to reduce this loss of passband.

The IEEE 1394 standard provides for access to the transmission medium to be achieved according to an arbitration principle. A master node (elected when starting up a bus) has the role of arbiter for adjudicating access of the other nodes to the bus. However, the standard does not provide for the concept of data windows for the transmission of asynchronous data. Thus, when an asynchronous transfer is initiated following a negotiation in respect of the obtaining of the bus, the duration of this transfer is not known a priori. As a result a node may be obliged to wait a time interval of variable duration when it asks to obtain the bus.

During the transmission of the clock of the bus, the master node must generate a synchronization pulse every 125 $\mu$s. This is achieved by dispatching a packet ("cycle start packet" or CSP) whose start constitutes the synchronization pulse. However, it may be that the bus is occupied at the moment that the cycle master of the bus must generate the packet. The latter must therefore await the end of the current transmission in order to obtain access to the bus. It then inserts into the packet transmitted the value of its time register so that the other nodes can slave their clock to its reference and perform the necessary correction. This jitter: regarding the start of the packet (estimated to be at most 78 $\mu$s) corresponds to the maximum duration of an asynchronous packet as defined in the IEEE 1394 document and to the duration of the acknowledgement phase mentioned in annex E of this same document. FIG. 2 illustrates the influence of jitter on the transmission of the frame start packet. Moreover, according to the example of FIG. 2, the control windows of the portals are distributed over the entire TDMA frame of the wireless network, and not concentrated at the start of the frame as in the example of FIG. 6 described earlier.

The transmission of the clock on an IEEE 1394 bus comprises two aspects: the transmission of the clock frequency (8 KHz), and the transmission of the time in absolute value, in the form of values of the time register. According to the IEEE 1394 standard, provision is made to achieve these two aspects at the same time: every 125 $\mu$s, the: cycle master node of the network generates a packet containing the value of its time register at the moment of transmission (this on account of the jitter of the bus).

According to the invention, when transmitting the clock over the wireless network, that is to say beyond the 1394 bus to which the cycle master of the network is linked, these two aspects (transmission of the frequency and transmission of the absolute value of the clock) are separated.

Concerning firstly the transmission of the clock over the wireless network, two cases arise: either the portal determining the clock of the wireless part of the network is connected to the master apparatus of the network by an IEEE 1394 bus, or it is itself this cycle master apparatus of the network.

In the first case, a maximum jitter of 78 $\mu$s can exist on the start of the cycle start packet dispatched to the "cycle server" portal by the master apparatus of the network: this is the jitter whose origin was explained with the aid of FIG. 2. According to the present exemplary embodiment, the insertion of the control window into the frame is not triggered directly by the reception of the cycle start packet on the cable bus, but rather determined by the time register of the cycle server portal. If it is assumed that a TDMA frame starts every 1 ms, then a TDMA frame must start every 131047 clock ticks. The jitter in the timing transmitted is thus eliminated by locking the start of the TDMA frame on the wireless network onto the clock of the cycle server portal. It should be noted that the time register of the portal is nevertheless slaved every 125 $\mu$s by the values received from the cycle start packets of the master node of the cable network, in a manner identical to any other node of a cable IEEE 1394 bus.

In the case where the cycle server portal is the master apparatus of the network, there is no jitter of the type described hereinabove. The clock of the cycle server portal free wheels.

FIG. 3 represents the circuits for connecting to the cable IEEE 1394 bus and the transmission part of a portal. The portal comprises a physical interface 30, a demodulation and channel decoding circuit 31 which extracts the values of the bits of the clock register of the cycle start packets (to use the terminology of the IEEE 1394 document), a time base 32 consisting of the clock register of the portal, incremented at the tempo of an internal clock comprising a phase locked loop furnished with a 24.576 MHz base frequency oscillator and lockable onto the cycle start packets of the cable bus, an asynchronous FIFO stack 33 for containing the useful data in respect of the transmission of asynchronous packets, an isochronous FIFO stack 34 for containing the useful data in respect of the isochronous transmission in the isochronous windows of the TDMA frames, as well as a circuit 35 for inserting control data, in particular data intended for the control window of the TDMA frame reserved for the portal. This latter circuit 35 also inserts the synchronization word at the start of its control window. The two FIFO stacks 33 and 34, as well as the insertion circuit 35 are each linked to a channel coding and: modulation circuit (only the circuit 37 is referenced), then to a multiplexer 36 controlled by a microprocessor $\mu$ which also manages the compensations for the processing lags described hereinbelow. The various connections of: the microprocessor, which is responsible for the entire management of the portal, are not illustrated in FIG. 3 so as not to impede the clarity of the schematic. The circuit 36 also assembles the TDMA frame. An analogue interface 39 effects the link with the radio-frequency wireless network and in particular the transpositions to the required frequency band.

It has been observed that the processing time on transmission or on reception in the wireless part of the network is not negligible relative to the temporal marking of the data packets. This delay corresponds to the modulation and channel coding at transmitter level, and to the channel decoding and demodulation at receiver level. According to the present exemplary embodiment, this processing time is compensated for both at transmitter and at receiver level. A transmitter portal, having a substantially fixed processing time, adds the number of clock ticks corresponding to this processing time to the clock value of its time register, so that the clock value included in the control window corresponds to the moment of actual transmission of the control window. Likewise, a receiver portal adds to the clock value received a number of clock ticks corresponding to its processing time. The processing times on transmission and on reception can be stored in registers at the level of each portal.

The recovery of the clock frequency, followed by the recovery of the clock value at the level of each portal will be described in what follows.

At the level of a portal other than the cycle server portal, the recovery of the clock timing is performed via a phase locked loop comprising a controlled oscillator with base frequency 24.576 MHz.

FIG. 4 is a schematic of the circuits for reception and for connection to a 1394 bus of one of the portals of FIG. 1. The portal of FIG. 4 comprises an analogue interface 40 for the reception of RF signals carrying out in particular the transpositions' to the base frequency band, a packet synchronization extractor 41 recovering the starts of the control windows and feeding a phase locked loop 42 for reconstructing the 8 kHz clock from the control window starts generated at a frequency of 8/N kHz, a circuit 43 for the demodulation and channel decoding of the content of the frame, the latter being demultiplexed by a demultiplexer 44 connected to an asynchronous FIFO stack 45, an isochronous FIFO stack 46 and a control data memory 47 also comprising a time register of the portal. The portal also comprises an IEEE 1394 link circuit 48 and a physical interface 49 with the cable IEEE 1394 bus associated with the portal. Lastly, the portal comprises a microprocessor $\mu'$.

FIG. 5 is a schematic of the circuit 42 of FIG. 4' The numerical values appearing in the figure are given by way of example. The 8 KHz clock restored must have jitter comparable with the jitter of the 8 KHz clock of a cable IEEE 1394 bus, the latter clock being slaved by the cycle start packets to the frequency of 8 kHZ, instead of 8/N KHz for the portals of the wireless network. This jitter corresponds to +/−½a period of 24576 MHz.

During a frame, each portal receives in an intelligible manner control windows of one or more other portals. It does not necessarily receive the control windows of each other portal, given the incomplete connectivity of the wireless part of the network. The portal selects one of the control windows received, favoring the window containing the shortest distance relative to the cycle server portal connected to the same bus as the cycle master apparatus of the network. It is of this control window that the portal uses to synchronize its own clock. Each control window comprises a synchronization word making it possible to tag the start thereof, and in its fixed window comprises the identification of the transmitter, as well as the distance of the latter relative to the cycle server portal. Each time the selected control window is tagged by the portal, the latter generates a pulse destined for its phase locked loop.

The distance between a portal of the wireless part of the network and the portal generating the temporal reference of this wireless part of the network (cycle server portal) is defined as being the minimum number of "hops" between this portal and the cycle server portal. In the present exemplary embodiment, this is the number of TDMA frames necessary in order for the content of the control window of the cycle server portal to reach the other portal. In practice, the portals which can be reached via wireless link directly via the cycle server portal are the distance "1" from the latter portal. The portals include the distance which separates them from the cycle server portal in their control window. A portal chooses, from among all the distances which it receives in an intelligible manner in the control windows, the shortest distance. This distance, incremented by 1, is its own distance relative to the cycle server portal. The distances are transmitted in all the control windows. The cycle server portal will have a distance of 0.

Advantageously, the synchronization is still performed on the basis of the same control window, as long as it is received in an intelligible manner. Thus, the routing time does not vary from frame to frame.

The transmission and the extraction of the clock value transmitted by the cycle server portal is performed as follows:

In the frame of the wireless network, the position and the size of each control window are fixed, so that there is no jitter regarding the start of a control window Cm from one frame to another. As a result there is no need to transmit the low-order bits of the time register of the cycle server portal (corresponding to the 24.576 MHz clock).

Per se, the synchronization of the clock values of the portals is necessary in order to achieve correct interpretation of the temporal labels defined in the IEC 61883 standard.

There are two possibilities for transmitting this time value:

Either the cycle server portal explicitly dispatches the necessary value of its time register on detection of this event (namely the 7 high-order bits describing the seconds, and the (13-N) intermediate-order bits describing the value of the 8/N kHz counter).

In actual fact there is no need to transmit a complete time value other than on the start-up of a node, so that it can acquire the absolute value held in the register of the cycle server portal: to transmit it to each control window would demand too much passband.

Or the cycle server portal continuously dispatches in its control window a subset of the bits of its time register, shifting them at each frame. This can be achieved as follows: 2 bits of each fixed window of each control window are dedicated to this use: the first bit indicates whether the second bit is the lowest-order bit of the clock value (bits not transmitted apart—see below) or whether it involves any other bit. The second bit is a bit of the clock value. The values of current bits are transmitted from the lowest-order to the highest-order. Thus a portal seeking to initialize itself waits for the signal indicating the presence of the lowest-order bit and begins refreshing its time register bit by bit in tandem with the frames, progressing towards the high-order bits. It is important that even during the refreshing of the register, the latter should continue to be incremented in tempo with the local clock generated by the phase locked loop.

If it is assumed that a TDMA frame is transmitted every 1 KHz, then only the 17 highest-order bits of the time register are significant and will actually be transmitted according to the second possibility.

The 12 bits of the lowest-order area, as well as the p lowest-order bits of the middle part of the clock register of the portal are determined by the portal itself, as a function of its own processing time.

On the transmitter side, it is assumed that this untransmitted 12-bit area is at 0 when a window is transmitted. To compensate for the processing time on transmission, transmission is triggered a predetermined number of clock ticks before the counter reaches the value corresponding to the area with 12 zero bits. The processing time on transmission is determined by calibration mechanisms, for example when designing the transmitter.

On the receiver side, a similar correction of the processing time on reception is performed.

To summarize, the propagation of the clock over the wireless network is achieved according to the following mechanism:

Each portal is furnished with a time register. This time register is used by each portal to trigger transmission of its own control window within the context of a TDMA frame.

Each portal carries out a slaving of its time register. This slaving depends on the topology of the network: if the portal is the cycle master apparatus of the network, then, there is no slaving regarding its time register. If the portal is connected to the same IEEE 1394 bus as the cycle master apparatus of the network (and if it is the only portal on this bus, otherwise contention resolution must be provided for between the competing portals), then the portal, dubbed the "network cycle server", slaves its time register to the cycle start packets received from its bus (like any IEEE 1394 "cycle slave" node). In all other cases, the portal must slave its time register to the reception of the control window the shortest distance from the "cycle server" portal.

The clock thus recovered by each portal is used for the bus to which the portal is connected.

Although the reception and transmission circuits of FIGS. 3 and 4 are represented separately in the description, it is clear that these circuits can be integrated into a single transmitter/receiver apparatus on the wireless network. It is quite obvious that in this case certain of the elements of these circuits need not be duplicated: microprocessor, physical 1394 circuit etc. will manage both reception and transmission. It is within the scope of the person skilled in the art to modify and to combine the reception and transmission circuits in one and the same apparatus without introducing any redundancy.

What is claimed is:

1. Method for synchronization in a communication network comprising at least two buses interconnected by a wireless communication network, each bus being linked to the wireless communication network by a portal, the method comprising the steps of:

determining a so-called cycle server portal comprising a reference clock that will serve as reference for the other portals;

transmitting, via each portal, a synchronization signal at a predetermined instant with respect to the start of a frame and characteristic of each portal, the frame being defined with respect to an internal clock of each portal, the synchronization signal being achieved via the insertion of a control window; and detecting, by each portal, the control windows of other portals and selecting one of the detected windows for the synchronization of the receiver portal's internal clock with the reference clock of the cycle server portal, the selected window corresponding to a portal whose clock is already synchronized with the reference clock of the cycle server portal.

2. Method according to claim 1, wherein a control window comprises at least a part of a value of the clock of the transmitter portal of the control window, the value being that of the clock at the moment of transmission of the control window, the value transmitted being used by the receiver portal to update the value of its own clock.

3. Method according to claim 2, wherein the clock value transmitted by a portal comprises a correction for compensating for the processing time of the control window on transmission.

4. Method according to claim 2 wherein the clock value received by a portal is corrected, before the updating of the value of its own clock, so as to take account of the reception processing time of the portal.

5. Method according to claim 2 wherein the clock value is split up into several groups of bits transmitted over successive control windows transmitted by one and the same portal.

6. Method according to claim 1 wherein it furthermore comprises the step of determining, by each portal, its distance with respect to the cycle server portal, the distance of a given portal being defined as being the minimum number of repeater portals required in order for an item originating from the cycle server portal to reach the given portal.

7. Method according to claim 6, wherein the control window chosen by a given portal for synchronizing itself is the control window of a portal having the shortest distance among the control windows received by the given portal.

8. Method according to claim 1 wherein it furthermore includes the step of locking a phase locked loop of a receiver portal to the instant of reception of the selected control window, the phase locked loop being used to increment a register containing the portal's own clock value.

9. Method according to claim 1 wherein it furthermore comprises the step of selecting a cycle master node of the entire communication network from among the nodes connected to the network, the cycle server portal being the portal connected to the bus to which the cycle master node of the network is also connected, the cycle server portal synchronizing its own clock to a clock of the cycle master node of the network.

10. Method according to claim 9, wherein the communication buses being of the IEEE 1394 type, the synchronization of the cycle server portal to the cycle master node of the network is performed by way of cycle start packets transmitted by the node, the frequency of transmission of frames over the wireless part of the network being a submultiple of the frequency of transmission of the cycle start packets.

11. Method according to claim 1 wherein a clock belonging to a portal which is not the cycle server portal is used to synchronize the bus to which the portal is connected.

12. Apparatus for interfacing a cable bus and a wireless communication network, the apparatus comprising:

means of clock recovery utilizing the cable bus, the recovery means comprising a phase locked loop for locking onto a periodic signal travelling around the cable bus and a counter for counting an own-clock absolute value, the counter being linked to a clock derived from the phase locked loop for the incrementation of the counter, the absolute value of the counter being synchronized with that of a node connected to the cable bus; and means of periodic transmission to the wireless communication network of a control window serving as time reference for the other apparatuses connected to the wireless network, the generation of the control window being bound with the state of the counter, the control window comprising an item relating to the state of the counter at the moment of transmission of the control window.

13. Apparatus for interfacing a cable bus and a wireless communication network, the apparatus comprising:

means of clock recovery utilizing a signal transmitted over the wireless communication network, the recovery means comprising a phase locked loop and an own-clock register;

means for selecting one control window from among a plurality of control windows transmitted over the wireless network;

means for extracting a synchronization of the control window for feeding the phase locked loop; and means for extracting items relating to an absolute value of a reference clock of the control window, and for updating the own-clock register.

* * * * *